US012562986B2

(12) United States Patent
    Krishan

(10) Patent No.: US 12,562,986 B2
(45) Date of Patent: Feb. 24, 2026

(54) METHODS, SYSTEMS, AND COMPUTER READABLE MEDIA FOR OPTIMIZED MULTI-DOMAIN SERVICE COMMUNICATION PROXY (SCP) ROUTING

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 946 days.

(21) Appl. No.: 17/824,313

(22) Filed: May 25, 2022

(65) Prior Publication Data
    US 2023/0388230 A1      Nov. 30, 2023

(51) Int. Cl.
    *H04L 45/745*       (2022.01)
    *H04L 45/00*        (2022.01)
    *H04L 61/4511*      (2022.01)
    *H04L 69/22*        (2022.01)

(52) U.S. Cl.
    CPC ............ *H04L 45/745* (2013.01); *H04L 45/26* (2013.01); *H04L 61/4511* (2022.05); *H04L 69/22* (2013.01)

(58) Field of Classification Search
    None
    See application file for complete search history.

(56) References Cited

U.S. PATENT DOCUMENTS

| | | | | |
|---|---|---|---|---|
| 11,689,450 | B2 * | 6/2023 | Pereira | ..................... G06F 9/547 |
| | | | | 709/232 |
| 11,864,093 | B2 | 1/2024 | Srivastava et al. | |
| 11,876,703 | B2 * | 1/2024 | Bartolome Rodrigo | ..................... |
| | | | | H04L 45/304 |
| 12,323,316 | B2 * | 6/2025 | Krishan | .................. H04L 45/34 |
| 2021/0111985 | A1 * | 4/2021 | Mahalank | ............... H04L 67/56 |
| 2021/0306326 | A1 | 9/2021 | Bykampadi et al. | |
| 2022/0086734 | A1 | 3/2022 | Aggarwal et al. | |
| 2022/0294775 | A1 * | 9/2022 | Singh | .................. H04L 63/0884 |
| 2022/0322053 | A1 * | 10/2022 | Das | ..................... H04L 41/0893 |
| 2022/0393971 | A1 * | 12/2022 | Bartolome Rodrigo | ..................... |
| | | | | H04L 45/02 |
| 2023/0188625 | A1 | 6/2023 | Rodrigo | |
| 2023/0254381 | A1 | 8/2023 | Rodrigo et al. | |
| 2023/0318960 | A1 | 10/2023 | Krishan et al. | |
| 2024/0015232 | A1 * | 1/2024 | Rodrigo | ............... H04L 67/142 |

(Continued)

OTHER PUBLICATIONS

Applicant-Initiated Interview Summary for U.S. Appl. No. 17/710,923 (Jul. 22, 2024).

(Continued)

*Primary Examiner* — Jason D Cardone

(74) *Attorney, Agent, or Firm* — Jenkins, Taylor & Hunt, P.A.

(57) ABSTRACT

A method for optimized multi-domain service communication proxy (SCP) routing includes receiving, at a first SCP, a service based interface (SBI) request for requesting service provided by a producer NF. The method further includes performing, by the first SCP, a reverse lookup to determine producer NF identification information. The method further includes modifying the SBI request to include the producer NF identification information. The method further includes determining an SCP domain of the producer NF. The method further includes routing the SBI request to a second SCP in a path for reaching the SCP domain of the producer NF.

18 Claims, 7 Drawing Sheets

(56)    References Cited

U.S. PATENT DOCUMENTS

| | | | |
|---|---|---|---|
| 2024/0022996 A1 | 1/2024 | Lu et al. | |
| 2024/0098161 A1* | 3/2024 | Brissette | H04L 45/14 |
| 2024/0422660 A1* | 12/2024 | Bartolome Rodrigo | |
| | | | H04W 48/18 |
| 2025/0150519 A1* | 5/2025 | Rodrigo | H04L 67/63 |
| 2025/0184402 A1* | 6/2025 | Bartolome Rodrigo | |
| | | | H04L 67/56 |
| 2025/0220753 A1* | 7/2025 | Li | H04W 76/18 |
| 2025/0337770 A1* | 10/2025 | Rajput | H04L 63/1441 |

OTHER PUBLICATIONS

Notice of Allowance and Fee(s) Due for U.S. Appl. No. 17/569,319 (Aug. 25, 2023).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Core Network and Terminals; 5G System; Network Function Reposi-tory Services; Stage 3 (Release 17)," 3GPP TS 29.510, V17.1.0, pp. 1-243 (Mar. 2021).

Final Office Action for U.S. Appl. No. 17/710,923 (Sep. 5, 2024).

Commonly-Assigned, co-pending U.S. Appl. No. 17/710,923 for "Methods, Systems, and Computer Readable Media for Service Communication Proxy (SCP) Routing," (Unpublished, filed Mar. 31, 2022).

"3rd Generation Partnership Project; Technical Specification Group Core Network and Terminals; 5G System; Technical Realization of Service Based Architecture; Stage 3 (Release 17)," 3GPP TS 29.500, V17.5.0, pp. 1-117 (Dec. 2021).

"3rd Generation Partnership Project; Technical Specification Group Core Network and Terminals; 5G System; Network Function Reposi-tory Services; Stage 3 (Release 17)," 3GPP TS 29.510, V17.4.0, pp. 1-284 (Dec. 2021).

"3rd Generation Partnership Project; Technical Specification Group Core Network and Terminals; 5G System; Principles and Guidelines for Services Definition; Stage 3 (Release 17)," 3GPP TS 29.501, V17.4.1, pp. 1-79 (Dec. 2021).

Fielding et al., "Hypertext Transfer Protocol (HTTP/1.1): Message Syntax and Routing," Internet Engineering Task Force (IETF), pp. 1-89 (Jun. 2014).

Advisory Action for U.S. Appl. No. 17/710,923 (Nov. 15, 2024).

Notice of Allowance for U.S. Appl. No. 17/710,923 (Feb. 4, 2025).

Non-Final Office Action for U.S. Appl. No. 17/710,923 (Apr. 4, 2024).

* cited by examiner

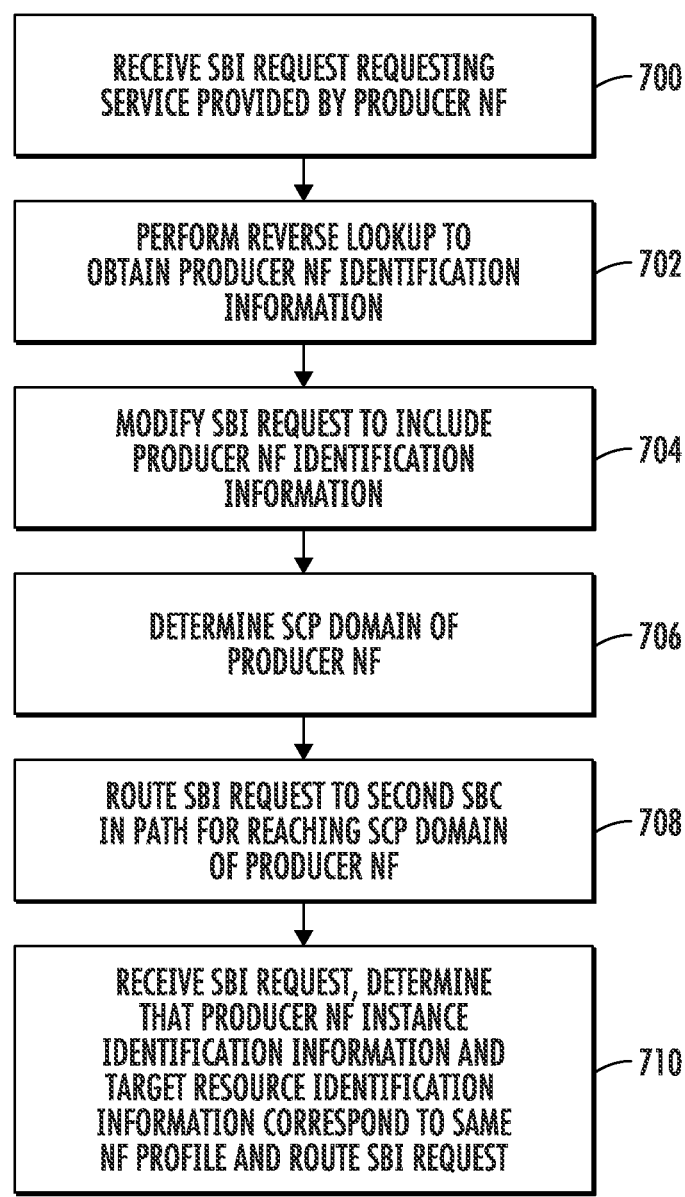

RECEIVE SBI REQUEST REQUESTING
SERVICE PROVIDED BY PRODUCER NF — 700

PERFORM REVERSE LOOKUP TO
OBTAIN PRODUCER NF IDENTIFICATION
INFORMATION — 702

MODIFY SBI REQUEST TO INCLUDE
PRODUCER NF IDENTIFICATION
INFORMATION — 704

DETERMINE SCP DOMAIN OF
PRODUCER NF — 706

ROUTE SBI REQUEST TO SECOND SBC
IN PATH FOR REACHING SCP DOMAIN
OF PRODUCER NF — 708

RECEIVE SBI REQUEST, DETERMINE
THAT PRODUCER NF INSTANCE
IDENTIFICATION INFORMATION AND
TARGET RESOURCE IDENTIFICATION
INFORMATION CORRESPOND TO SAME
NF PROFILE AND ROUTE SBI REQUEST — 710

FIG. 7

METHODS, SYSTEMS, AND COMPUTER READABLE MEDIA FOR OPTIMIZED MULTI-DOMAIN SERVICE COMMUNICATION PROXY (SCP) ROUTING

TECHNICAL FIELD

The subject matter described herein relates to routing messages between SCPs. More particularly, the subject matter described herein relates to methods, systems, and computer readable media for adding producer NF identification information to service based interface (SBI) requests for optimized multi-domain SCP routing.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is that an operator can divide its network into multiple SCP domains, each having one or more SCPs, and each SCP in the path for an SBI request from a consumer NF to a producer NF may be required to perform a reverse lookup to determine producer NF identification information for the SBI request. For example, when a consumer NF or SCP sends an SBI request to a producer NF in a network that has multiple SCP domains, the SBI request may pass through multiple SCPs when traveling from the consumer NF or SCP to the producer NF. Each SCP in the path between the consumer NF or SCP and the producer NF will need to run a reverse lookup using the producer NF fully qualified domain name (FQDN) from the 3gpp-Sbi-Target-apiRoot header to locate the NF profile or the NF service profile of the producer NF and extract the NF instance identifier and/or the service instance identifier from the NF profile or the NF service profile. The NF instance identifier and service instance identifier are referred to herein as producer NF identification information. The process of using the FQDN from the 3gpp-Sbi-Target-apiRoot header to locate the NF profile or the NF service profile and obtain the producer NF identification information is referred to as a reverse lookup. Requiring each SCP in the path from the consumer NF (or originating SCP) to the producer NF to perform the reverse lookup is undesirable, as repeatedly performing the same reverse lookup causes processing delay and wastes processing resources in the operator's network.

Accordingly, in light of these and other difficulties, there exists a need for improved methods, systems, and computer readable media for optimized multi-domain SCP routing.

SUMMARY

A method for optimized multi-domain service communication proxy (SCP) routing includes receiving, at a first SCP, a service based interface (SBI) request for requesting service provided by a producer NF. The method further includes performing, by the first SCP, a reverse lookup to determine producer NF identification information. The method further includes modifying the SBI request to include the producer NF identification information. The method further includes determining an SCP domain of the producer NF. The method further includes routing the SBI request to a second SCP in a path for reaching the SCP domain of the producer NF.

According to another aspect of the subject matter described herein, performing the reverse lookup includes reading a fully qualified domain name (FQDN) of the producer NF from a 3gpp-Sbi-Target-apiRoot header of the SBI request, using the FQDN of the producer NF to locate an NF profile or an NF service profile of the producer NF, and obtaining the producer NF identification information from the NF profile or the NF service profile.

According to another aspect of the subject matter described herein, wherein performing the reverse lookup includes using a service name and version from a path header of the SBI request to locate the NF profile or the NF service profile.

According to another aspect of the subject matter described herein, obtaining the producer NF identification information from the NF profile or the NF service profile includes obtaining an NF instance identifier of the producer NF from the NF profile and a service instance identifier of the producer NF from the NF profile or the NF service profile and modifying the SBI request to include the producer NF identification information includes modifying the SBI request to include the NF instance identifier and the service instance identifier of the producer NF.

According to another aspect of the subject matter described herein, performing the reverse lookup includes performing the reverse lookup in a producer profile database local to the first SCP.

According to another aspect of the subject matter described herein, the method for optimized multi-domain SCP routing comprises, in response to failing to locate the NF profile or the NF service profile in the producer profile database local to the first SCP, obtaining the NF or service profile from an NF repository function (NRF) using an NF discovery service operation.

According to another aspect of the subject matter described herein, modifying the SBI request to include the producer NF identification information includes creating at least one custom header including the producer NF identification information and adding the at least one custom header to the SBI request.

According to another aspect of the subject matter described herein, determining a domain of the producer NF includes reading an SCP domain identifier from an scpDomains attribute of an NF profile of the producer NF and wherein routing the SBI request includes obtaining a list of domains for reaching the SCP domain of the producer NF and identifying the second SCP as a next-hop SCP from the list.

According to another aspect of the subject matter described herein, the method for optimized multi-domain SCP routing includes, at the second SCP, receiving the SBI request including the producer NF identification information, determining that IP endpoint or fully qualified domain (FQDN) information in a 3gpp-Sbi-Target-apiRoot header of the SBI request does not match IP endpoint or FQDN information in an NF or service profile obtained or located using the producer NF identification information of the producer NF and, in response, performing the reverse lookup.

According to another aspect of the subject matter described herein, a system for optimized multi-domain service communication proxy (SCP) routing is provided. The system includes a first SCP including at least one processor and a memory. The system further includes an optimized multi-domain SCP router implemented by the at least one processor for receiving, at a first SCP, a service based interface (SBI) request for requesting service provided by a producer NF, performing a reverse lookup to determine producer NF identification information, modifying the SBI request to include the producer NF identification information, determining an SCP domain of the producer NF, and routing the SBI request to or towards a domain of the producer NF.

According to another aspect of the subject matter described herein, in performing the reverse lookup, the optimized multi-domain SCP router is configured to read a fully qualified domain name (FQDN) of the producer NF from a 3gpp-Sbi-Target-apiRoot header of the SBI request, use the FQDN of the producer NF to locate an NF profile or an NF service profile of the producer NF, and obtain the producer NF identification information from the NF profile or the NF service profile.

According to another aspect of the subject matter described herein, in performing the reverse lookup, he optimized multi-domain SCP router is configured to use a service name and version from a path header of the SBI request.

According to another aspect of the subject matter described herein, in obtaining the producer NF identification information from the NF profile or the NF service profile, the optimized multi-domain SCP router is configured to obtain an NF instance identifier of the producer NF from the NF profile and a service instance identifier of the producer NF from the NF profile or the NF service profile, and, in modifying the SBI request to include the producer NF identification information, the optimized multi-domain SCP router is configured to modify the SBI request to include the NF instance identifier and the service instance identifier of the producer NF.

According to another aspect of the subject matter described herein, the optimized multi-domain SCP router is configured to perform the reverse lookup in producer profile database local to the first SCP or obtain the profile or the NF service profile using an NF discovery service operation.

According to another aspect of the subject matter described herein, in modifying the SBI request to include the producer NF identification information, the optimized multi-domain SCP router is configured to create at least one custom header including the producer NF identification information and add the at least one custom header to the SBI request.

According to another aspect of the subject matter described herein, in determining a domain of the producer NF, the optimized multi-domain SCP router is configured to read an SCP domain identifier from an scpDomains attribute of an NF profile of the producer NF and, in routing the SBI request, the optimized multi-domain SCP router is configured to obtain a list of domains for reaching the SCP domain of the producer NF and identify a second SCP as a next-hop SCP from the list.

According to another aspect of the subject matter described herein, the system for optimized multi-domain SCP routing includes a second SCP for receiving the SBI request including the producer NF identification information, determining that IP endpoint or fully qualified domain (FQDN) information in a 3gpp-Sbi-Target-apiRoot header of the SBI request matches IP endpoint or FQDN information in an NF or service profile of the producer NF obtained or located using the producer NF identification information and routing the SBI request without performing the reverse lookup.

According to another aspect of the subject matter described herein, the system for optimized multi-domain SCP routing includes a second SCP for receiving the SBI request including the producer NF identification information, determining that IP endpoint or fully qualified domain (FQDN) information in a 3gpp-Sbi-Target-apiRoot header of the SBI request does not match IP endpoint or FQDN information in an NF or service profile obtained or located using the producer NF identification information of the producer NF and, in response, performing the reverse lookup.

According to another aspect of the subject matter described herein, a non-transitory computer readable medium having stored thereon executable instructions that when executed by a processor of a computer control the computer to perform steps is provided. The steps include receiving, at a first service communication proxy (SCP), a service based interface (SBI) request for requesting service from a producer NF. The steps further include performing, by the first SCP, a reverse lookup to determine producer NF identification information. The steps further include modifying the SBI request to include the producer NF identification information. The steps further include determining an SCP domain of the producer NF. The steps further include routing the SBI request to a second SCP in a path for reaching the SCP domain of the producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 7 is a flow chart illustrating an exemplary process for optimized multi-domain SCP routing.

DETAILED DESCRIPTION

Figure 1:
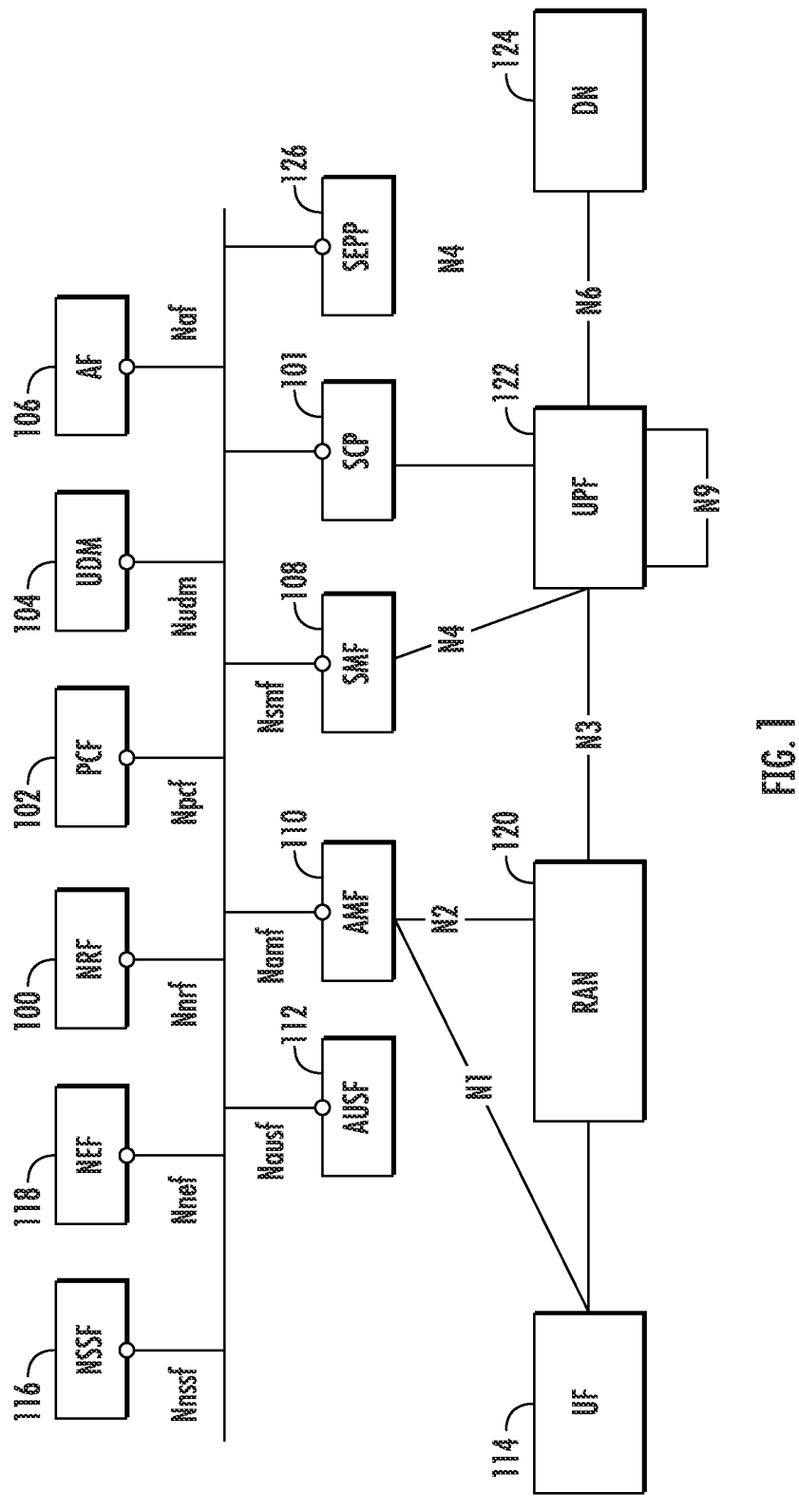
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a unified data management (UDM) 104 that manages user data, and an application function (AF) 106 that provides application services.

The NFs illustrated in FIG. 1 further include an SMF 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
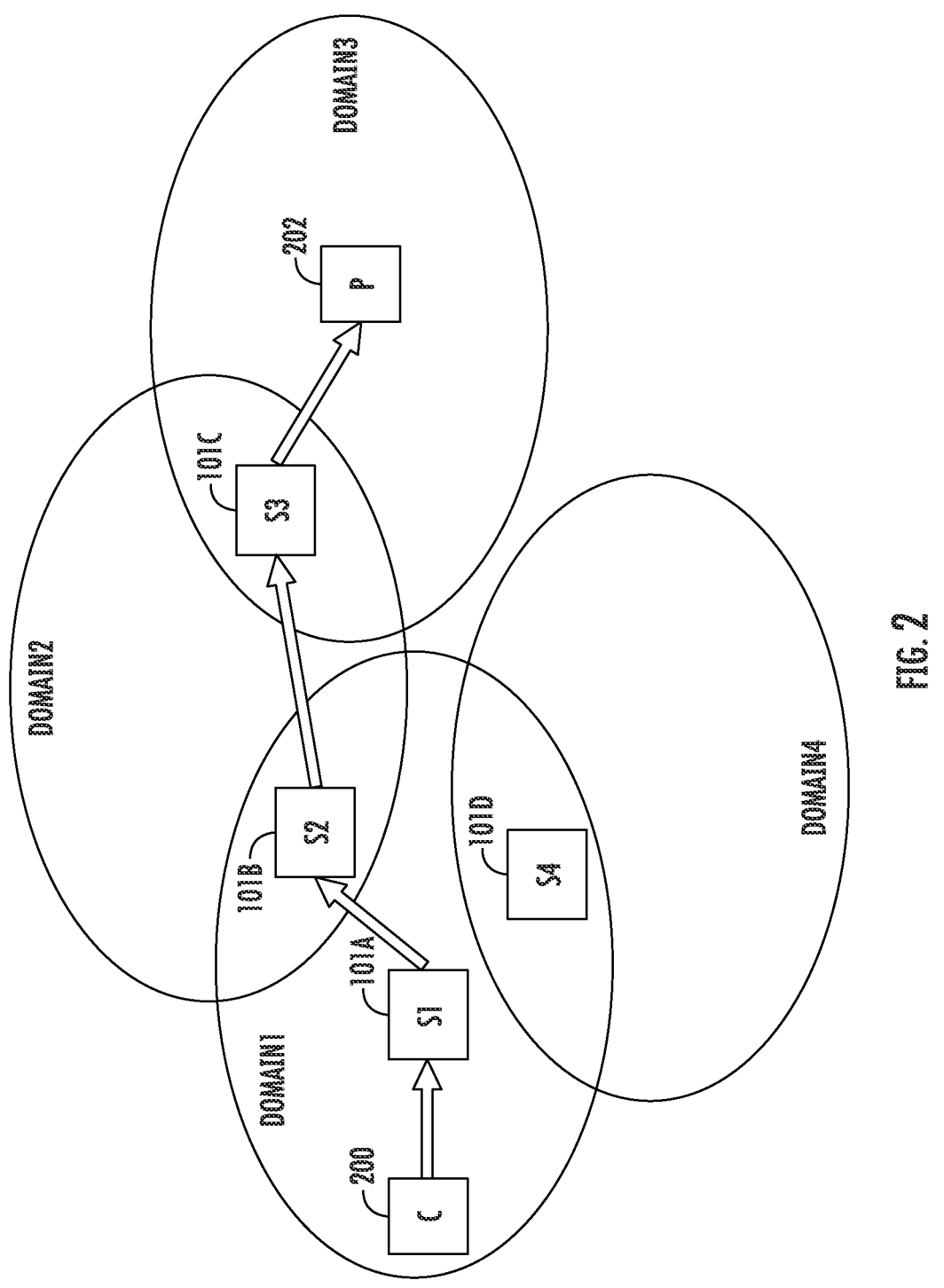
FIG. 2 is a network diagram illustrating a network divided into multiple SCP domains.

As stated above, one problem that can occur in 5G and other types of networks is that each of multiple SCPs in a path from a consumer NF to a producer NF in a network with multiple SCP domains may be required to perform a reverse lookup to determine producer NF identification information for an SBI request. FIG. 2 is a network diagram illustrating a network with multiple SCP domains. In FIG. 2, a consumer NF 200 located in domain1 of an operator's network may need to route an SBI request to a producer NF 202 located in domain3 of the operator's network. The SBI request will be routed through multiple SCP 101A, 101B, and 101C when traveling from consumer NF 200 to producer NF 202. When SCP 101A receives the SBI request from consumer NF 200, SCP 101A performs a reverse lookup to find producer NF identification information. Performing the reverse lookup includes extracting the FQDN from the 3gpp-Sbi-Target-apiRoot header of the SBI request, using the FQDN to locate the NF profile or NF service profile of the producer NF, and extracting the producer NF identification information from the NF profile or the NF service profile. As stated above, the producer NF identification information may include the NF instance identifier, the service instance identifier, or both. SCP 101A also reads the value of the scpDomains attribute from the NF profile, determines that the domain of producer NF 202 is domain3 and obtains a domain routing list using the SCPDomainRoutingInfoGet API or subscribes with the NRF (i.e., using the SCPDomainRoutingInfoSubscribe API) for notifications at runtime and finds that domain3 is routable from domain2 only. Thus, SCP 101A attempts to find an indirect routing path to domain3. In this example, SCP 101A determines that domain3 is only reachable from domain2. Accordingly, SCP 101A forwards the SBI request to SCP 101B in domain2.

SCP 101B in domain2 performs the reverse lookup to obtain the NF profile information, determines the domain of producer NF 202, and determines that the domain of producer NF 202 can be reached through SCP 101C. Accordingly, SCP 101B routes the SBI request to SCP 101C.

SCP 101C performs the reverse lookup to obtain the producer NF identification information for producer NF 202 and the domain of producer NF 202, determines that the domain of producer NF 202 is domain3, and routes the SBI request to producer NF 202 in domain3.

Requiring each SCP to perform the reverse lookup using the FQDN and optionally other parameters, like service name and version from the path header, to obtain the NF profile is undesirable, as repeatedly performing the reverse lookup causes processing delay in responding to an SBI request. In addition, requiring duplicate processing at each SCP instance is wasteful of network resources.

In order to avoid or at least reduce duplicate processing in a network with multiple SCP domains, the subject matter described herein includes having the first SCP in a routing path of an SBI request from a consumer NF to a producer NF perform the reverse lookup using the FQDN extracted from the 3gpp-Sbi-Target-apiRoot header and optionally other parameters, like service name and version from the path header, of the message to obtain the NF profile or the NF service profile of the producer NF and insert producer NF identification information, such as the NF instance ID and the service instance ID, in the SBI request. Subsequent SCPs in the routing path between the consumer NF and the producer NF can use the NF instance ID or the service instance ID to obtain the NF profile or the NF service profile and avoid performing the reverse lookup of using the FQDN from the 3gpp-Sbi-Target-apiRoot header and optionally other parameters, like service name and version from the path header, to locate the NF profile or the NF service profile. Because NF profiles and NF service profiles are respectively indexed by NF instance ID and or service instance ID, it is believed to be computationally less intensive to use the NF instance ID or the service instance ID to locate the NF profile or the NF service profile than it is to do the reverse lookup using the FQDN extracted from the 3gpp-Sbi-Target-apiRoot header and optionally other parameters, like service name and version from the path header, to locate the NF profile or the NF service profile.

In one exemplary implementation, the first SCP encountered by an SBI request when traveling from a consumer NF to a producer NF adds custom headers vendor_producer_id and vendor_producer_service_id to an SBI service request to carry the producer NF instance id and service instance id (respectively) in the SBI request. The custom headers may be structured as follows:

vendor_producer_id header with value "<Nf instance id of producer NF instance>; and vendor_producer_service_id header with value <Service instance id of producer NF instance> (this is available to the initial SCP by performing the reverse lookup to find the NF profile)

The next-hop SCP that receives the SBI request can avoid performing the reverse lookup by referring to the vendor_producer_id custom header in the request to obtain the NF instance ID of the producer NF instance and using the NF instance ID, instead of the FQDN from the 3gpp-Sbi-Target-apiRoot header and optionally other parameters, like service name and version from the path header, to obtain the NF profile or the NF service profile. To detect the case where a previous SCP has changed the 3gpp-Sbi-Target-apiRoot header for alternate routing, but does not change the NF instance ID carried in the vendor_producer_id custom header, the next-hop SCP checks whether the value of the FQDN or ipEndPoints attribute carried in the 3gpp-Sbi-Target-apiRoot header matches the FQDN/IP endpoint information in the NF service profile or the NF profile. If the value of the 3gpp-Sbi-Target-apiRoot header does not match with the FQDN/IP endpoint in the NF service profile or NF profile, the intermediate SCP re-runs the logic to obtain the NF profile or the NF service profile of the producer NF whose FQDN is specified in the 3gpp-Sbi-Target-apiRoot header, calculates the routing path to the newly identified producer NF, and updates the value of vendor_producer_id and vendor_producer_service_id custom headers.

Figure 3:
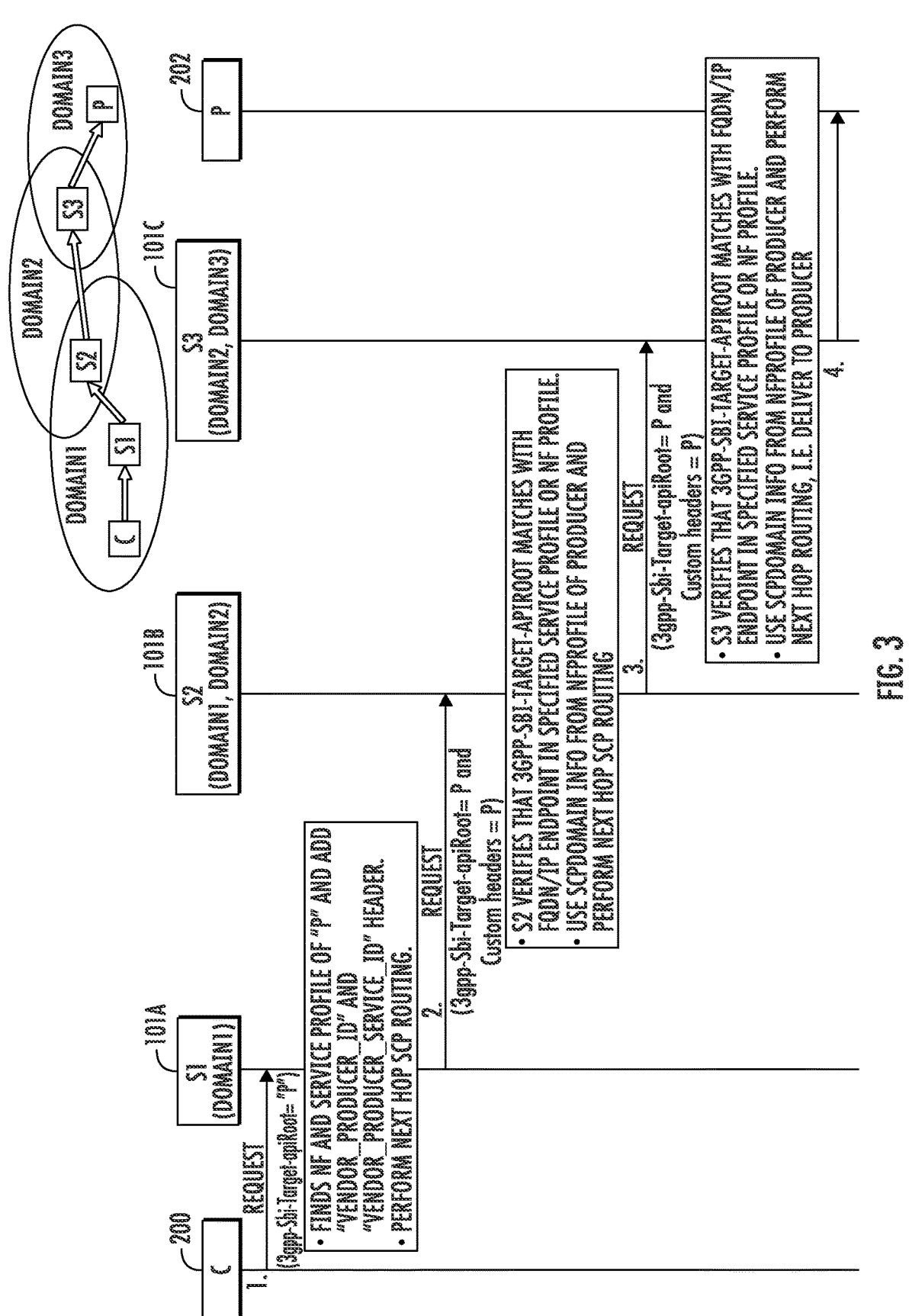
FIG. 3 is a message flow diagram illustrating exemplary messages exchanged for optimized multi-domain SCP routing where the target resource identified in the 3gpp-Sbi-Target-apiRoot remains the same during routing of an SBI request.

FIG. 3 is a message flow diagram illustrating exemplary messages exchanged in optimized multi-domain SCP routing were the first SCP modifies an SBI request to include the NF instance ID and the service instance ID obtained from the NF profile of a producer NF. Referring to FIG. 3, in line 1, a consumer NF generates and sends to SCP 101A an SBI request message with a 3gpp-Sbi-Target-apiRoot parameter that identifies a target resource on producer NF 202. SCP 101A receives the SBI request and performs the reverse lookup using all or part of the FQDN of the target resource from the 3gpp-sbi-Target-apiRoot header and optionally other parameters, like service name and version from the path header, to obtain the NF instance identifier and service instance identifier of producer NF 202. SCP 101A inserts the NF instance identifier in the vendor_producer_id header and the service instance identifier in the vendor_producer_service_id header. SCP 101A then performs next-hop SCP routing by determining that the domain of producer NF 202 is domain3 and that SCP 101B is the next-hop SCP in reaching domain3.

In line 2 of the message flow diagram, SCP 101A sends to next-hop SCP 101B the SBI request with the 3gpp-Sbi-Target-apiRoot header identifying a target resource located on producer NF 202 and the custom headers that contain the NF instance ID and service instance ID of producer NF 202. SCP 101B receives the SBI request and compares the target resource identification information in the 3gpp-Sbi-Target-apiRoot header to the FQDN/IP endpoint information in the NF service profile or the NF profile. In this example it is assumed that the parameter in the 3gpp-Sbi-Target-apiRoot header matches the FQDN/IP endpoint information specified in the NF service profile or the NF profile. It is also noted that SCP 101B is not required to perform the reverse lookup using the 3gpp-Sbi-Target-apiRoot information and optionally other parameters, like service name and version from the path header, to locate the NF profile or the NF service profile. Instead, SCP 101B can locate the NF profile or the NF service profile using the NF instance ID or the service instance ID stored in the custom headers, thus saving processing. SCP 101B uses SCP domain information from the NF profile of producer NF 202 to perform next hop SCP routing. In this example, it is assumed that SCP 101B determines that SCP 101C is the next hop SCP in reaching producer NF 202.

In line 3, SCP 101B forwards the SBI request to SCP 101C. The SBI request includes the 3gpp-Sbi-Target-api-Root header identifying a target resource on producer NF 202 and the custom headers carrying the NF instance ID of producer NF 202 and the service identifier of producer NF 202. SCP 101C receives the SBI request and verifies that the value of the parameters in the 3gpp-Sbi-Target-apiRoot header match the FQDN/IP endpoint information specified in the NF profile or the service profile. It should also be noted that SCP 101C is not required to perform the reverse lookup to locate the NF profile or the NF surface profile of producer NF 202 using a parameter from the 3gpp-Sbi-Target-apiRoot header. Instead, SCP 101C uses the NF Instance ID to locate the NF profile and the service instance ID to locate the service profile. SCP 101C uses SCP domain information from the NF profile of producer NF 202 to identify domain3 as the domain of producer NF 202 and performs next-hop routing.

In line 4 of the message flow diagram, SCP 101C sends the SBI request to producer NF 202. The SBI request identifies producer NF 202 as the authority and contains the custom headers with the NF instance identifier and the service identifier of producer NF 202. Thus, in the example in FIG. 3, reverse lookups using a parameter from the 3gpp-Sbi-Target-apiRoot header are avoided at SCPs 101B and 101C because the target resource remains the same, and SCPs 101B and 101C are capable of processing and understanding the custom headers.

Figure 4:
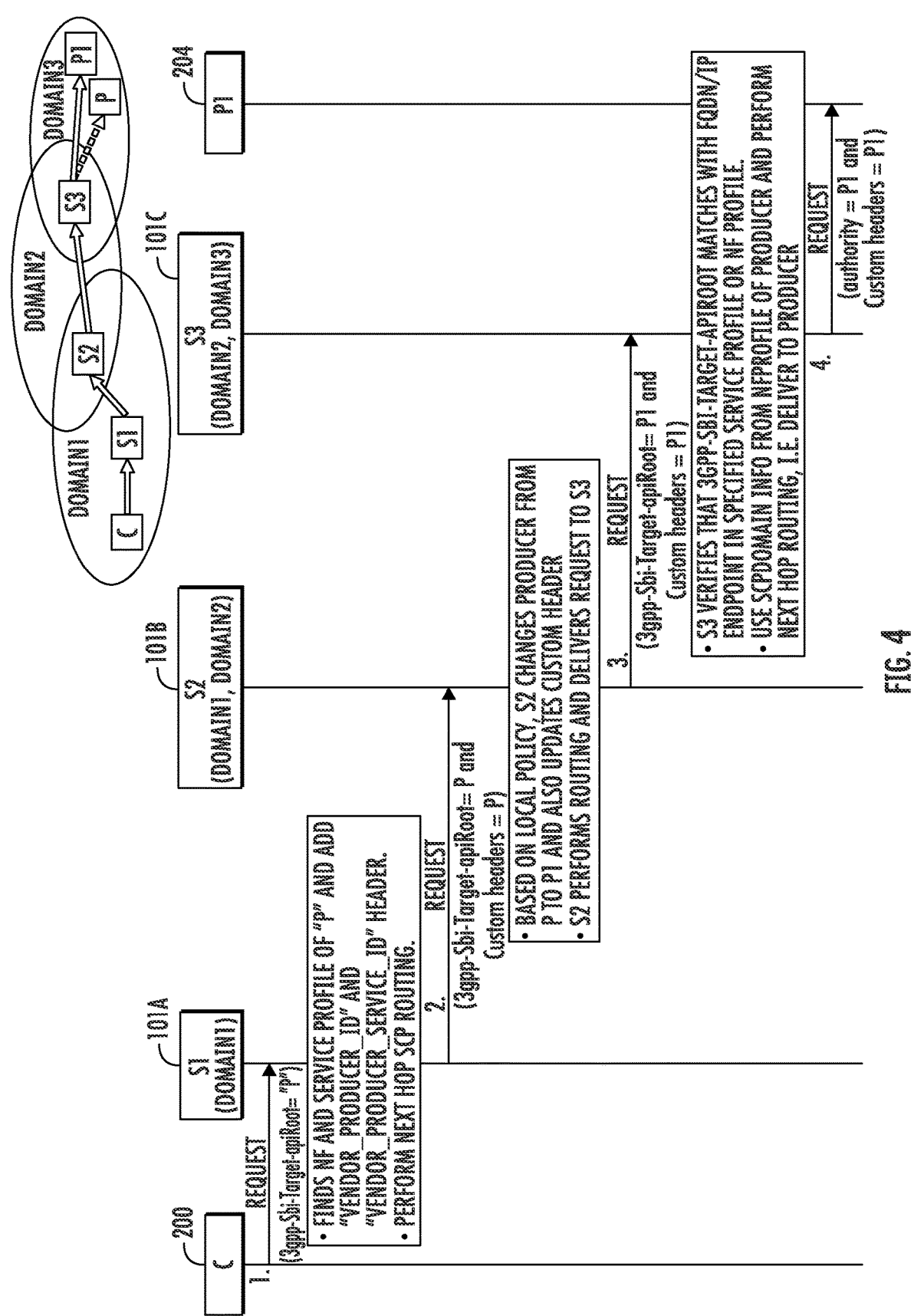
FIG. 4 is a message flow diagram illustrating exemplary messages exchanged for optimized multi-domain SCP routing where an intermediate SCP that receives and SBI request alters the target resource in the 3gpp-Sbi-Target-apiRoot header and the custom headers carrying the NF instance identifier and the NF service identifier of the producer NF.

FIG. 4 is a message flow diagram illustrating exemplary messages exchanged for optimized multi-domain SCP routing where an intermediate SCP alters the target resource in the 3gpp-Sbi-Target-apiRoot header of an SBI request and the custom headers carrying the NF instance identifier and the service identifier of the producer NF. Referring to FIG. 4, in line 1, a consumer NF generates and sends to SCP 101A an SBI request message with a 3gpp-Sbi-Target-apiRoot header that identifies a target resource P on producer NF 202. SCP 101A receives the SBI request and performs the reverse lookup using all or part of the FQDN of the target resource from the 3gpp-sbi-Target-apiRoot header and optionally other parameters, like service name and version from the path header, of the SBI request to obtain the NF instance identifier and service instance identifier of producer NF 202. SCP 101A inserts the NF instance identifier in the vendor_producer_id header and the service instance identifier in the vendor_producer_service_id header. SCP 101A then performs next-hop SCP routing by determining that the domain of producer NF 202 is domain3 and that SCP 101B is the next-hop SCP in reaching domain3.

In line 2 of the message flow diagram, SCP 101A sends to next-hop SCP 101B the SBI request with the 3gpp-Sbi-Target-apiRoot header identifying target resource P located on producer NF 202 and the custom headers that contain the NF instance ID and service instance ID of producer NF 202 on which target resource P is located. SCP 101B receives the SBI request, and, based on local policy, changes the target resource identified in the 3gpp-Sbi-Target-apiRoot header from P on producer NF 202 to P1 on producer NF 204. It is assumed that SCP 101B is compatible with the custom headers carrying the NF instance ID and the service instance ID. Accordingly, SCP 101B alters the contents of the custom headers to include the NF instance ID and service instance ID from the NF or service profile of producer NF 204, which hosts target resource P1, which is the target resource identified in the 3gpp-Sbi-Target-apiRoot header.

In line 3, SCP 101B forwards the SBI request to SCP 101C. The SBI request includes the 3gpp-Sbi-Target-api-Root header identifying the target resource P1 on producer NF 204 and the custom headers carrying the NF instance ID of producer NF 204 and the service identifier of producer NF 204. It is assumed that SCP 101C is compatible with the custom header values. Accordingly, SCP 101C receives the SBI request, reads the NF instance identifier and service instance identifier from the custom headers, locates the corresponding NF profile or service profile, and compares the value of the FQDN and/or ipEndPoints attribute in the NF profile or service profile with the value identifying the target resource in the 3gpp-Sbi-Target-apiRoot header and determines that the value identifying the target resource matches the value of the fqdn or ipEndPoints attribute from the NF or service profile. In this case, the value identifying the target resource in the 3gpp-Sbi-Target-apiRoot header identifies resource P1 on producer NF 204 and the value of the FQDN or ipEndPoints attribute of the NF or service profile identified by the NF instance ID or the service instance ID in the custom header also identifies resource P1 on producer NF 204. Accordingly, in this case, SCP 101C can forward the SBI request without needing to modify the values stored in the custom headers.

In line 4 of the message flow diagram, SCP 101C sends the SBI request to producer NF 204. The SBI request identifies target resource P1 on producer NF 204 as the authority and contains the custom headers with the NF instance identifier and the NF service identifier of the NF or service profile of producer NF 204, which identifies P1 in its fqdn or ipEndPoints attribute. Thus, in the example in FIG. 4, the SBI request is properly routed despite alternate routing by an intermediate SCP.

Figure 5:
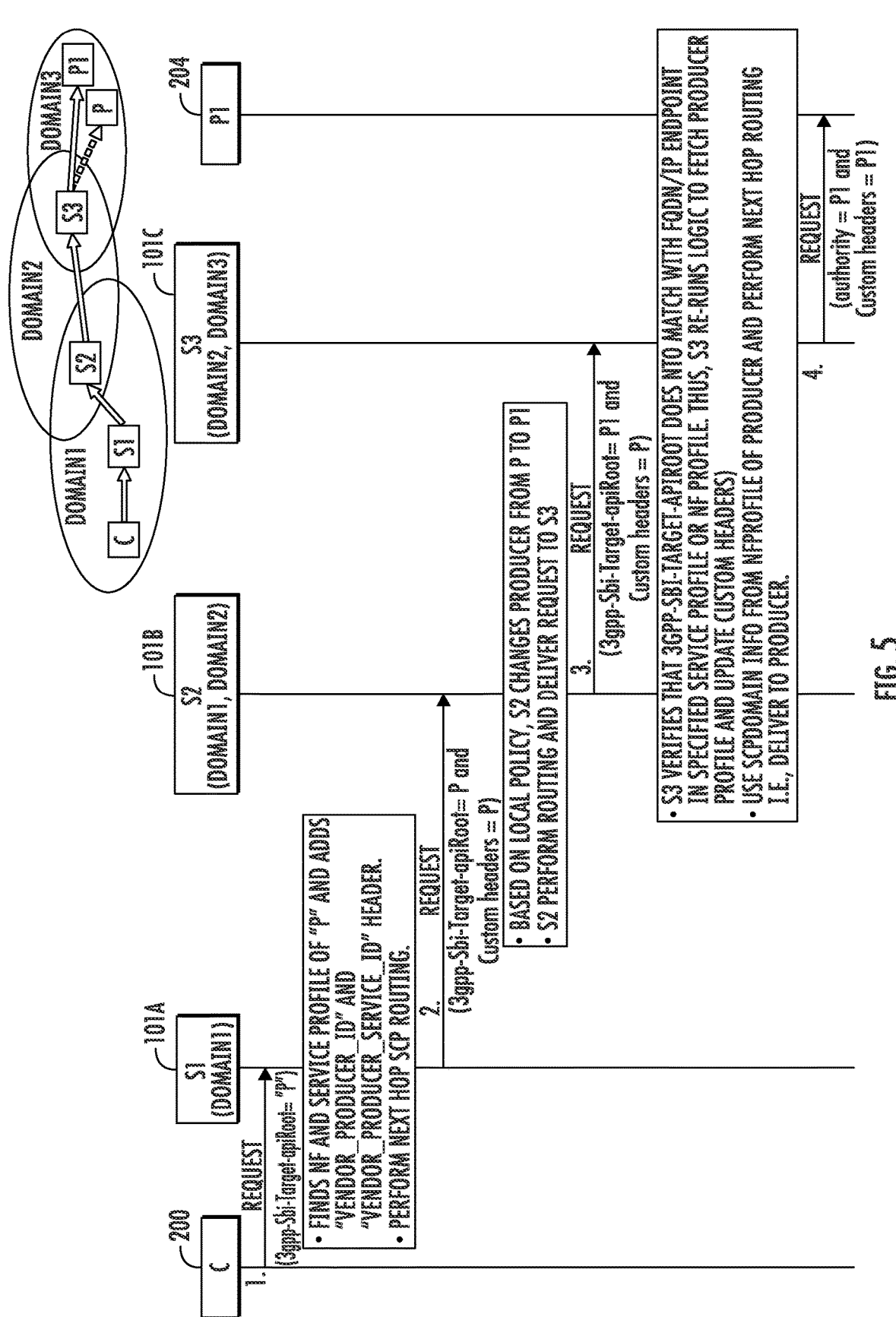
FIG. 5 is a message flow diagram illustrating exemplary messages exchanged for optimized multi-domain SCP routing where an intermediate SCP that receives an SBI request alters the target resource in the 3gpp-Sbi-Target-apiRoot header of an SBI request but does not alter the custom headers carrying the NF instance identifier and the service instance identifier of the producer NF.

FIG. 5 is a message flow diagram illustrating exemplary messages exchanged for optimized multi-domain SCP routing where an intermediate SCP alters the target resource in the 3gpp-Sbi-Target-apiRoot header of an SBI request but does not alter the custom headers carrying the NF instance identifier and the service identifier of the producer NF. Referring to FIG. 5, in line 1, a consumer NF generates and sends to SCP 101A an SBI request message with a 3gpp-Sbi-Target-apiRoot header that identifies a target resource P on producer NF 202. SCP 101A receives the SBI request and performs the reverse lookup using all or part of the FQDN of the target resource from the 3gpp-sbi-Target-apiRoot header and optionally other parameters, like service name and version from the path header, of the SBI request to obtain the NF instance identifier and service instance identifier of producer NF 202. SCP 101A inserts the NF instance identifier in the vendor_producer_id header and the service instance identifier in the vendor_producer_service_id header. SCP 101A then performs next-hop SCP routing by determining that the domain of producer NF 202 is domain3 and that SCP 101B is the next-hop SCP in reaching domain3.

In line 2 of the message flow diagram, SCP 101A sends to next-hop SCP 101B the SBI request with the 3gpp-Sbi-Target-apiRoot header identifying a target resource located on producer NF 202 and the custom headers that contain the NF instance ID and service instance ID of producer NF 202. SCP 101B receives the SBI request, and, based on local policy, changes the target resource identified in the 3gpp-Sbi-Target-apiRoot header from P on producer NF 202 to P1 on producer NF 204. It is assumed that SCP 101B is not compatible with the custom headers carrying the NF instance ID and the service instance ID. Accordingly, SCP 1018 does not alter the contents of the custom headers, resulting in a mismatch between ipEndPoints or FQDN attributes of the NF or service profile corresponding to the NF instance ID and service instance ID carried in the custom headers and the target resource identified in the 3gpp-Sbi-Target-apiRoot header.

In line 3, SCP 1018 forwards the SBI request to SCP 101C. The SBI request includes the 3gpp-Sbi-Target-apiRoot header identifying the target resource P1 on producer NF 204 and the custom headers carrying the NF instance ID of producer NF 202 and the service identifier of producer NF 202. It is assumed that SCP 101C is compatible with the custom header values. Accordingly, SCP 101C receives the SBI request, reads the NF instance identifier and service instance identifier from the custom headers, locates the corresponding NF profile or service profile, and compares the value of the fqdn and/or ipEndPoints attribute in the NF profile or service profile with the value identifying the target resource in the 3gpp-Sbi-Target-apiRoot header and determines that the value identifying the target resource does not match the value of the fqdn or ipEndPoints attribute from the NF or service profile. In this case, the value identifying the target resource in the 3gpp-Sbi-Target-apiRoot header identifies resource P1 on producer NF 204 and the value of the fqdn or ipEndPoints attribute of the NF or service profile identified by the NF instance ID or the service instance ID in the custom header identifies resource P on producer NF 202. Accordingly, in this case, SCP 101C performs the reverse lookup using P1 to obtain the NF or service profile of producer NF 204 and updates the values of the custom header with the NF instance ID and the service instance ID from the NF or service profile obtained using target resource identifier P1.

In line 4 of the message flow diagram, SCP 101C sends the SBI request to producer NF 204. The SBI request identifies target resource P1 on producer NF 204 as the authority and contains the custom headers with the NF instance identifier and the NF service identifier of the NF or service profile of producer NF 204. Thus, in the example in FIG. 5, the SBI request is properly routed despite incompatibility with the custom headers and alternate routing by an intermediate SCP.

Figure 6:
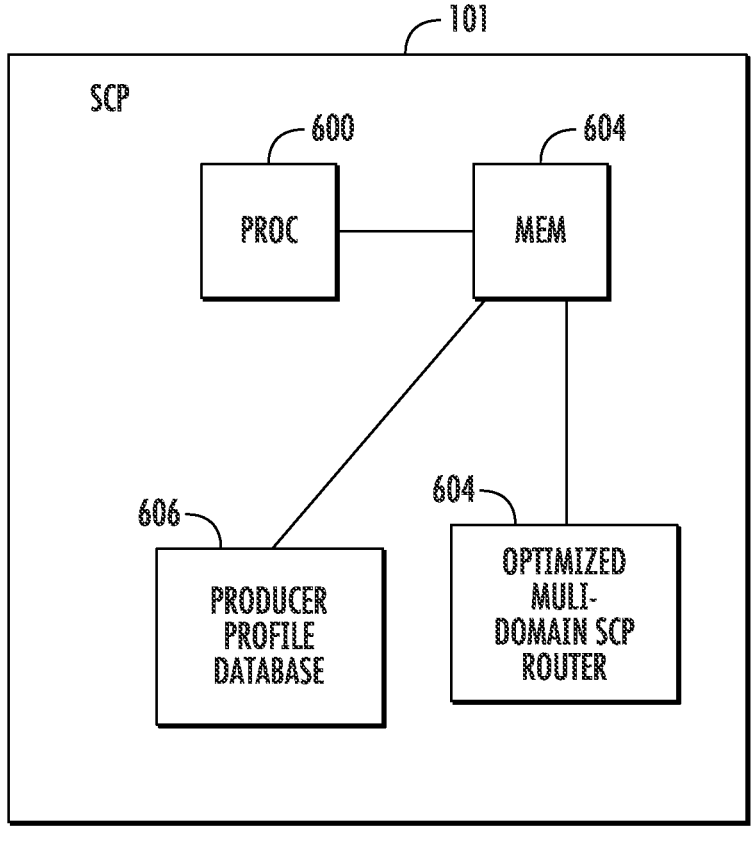
FIG. 6 is a block diagram illustrating an exemplary architecture for an SCP capable of optimized multi-domain SCP routing.

FIG. 6 is a block diagram illustrating an exemplary architecture for an SCP capable of performing optimized multi-domain SCP routing as described herein. Referring to FIG. 6, SCP 101 includes at least one processor 600 and a memory 602. SCP 101 further includes an optimized multi-domain SCP router 604 that performs the steps described herein for optimized multi-domain SCP routing. These steps include receiving SBI requests and modifying the requests to include producer NF identification information. The steps may also include receiving SBI requests that include producer NF identification information and determining whether the NF profile parameters that correspond to the NF profiles identified by the producer NF identification information correspond to target resource identification parameters carried in the 3gpp-sbi-target-apiRoute header of the SBI requests. SCP 101 may also include a producer profile database 606 that stores local copies of NF profile and service profiles of producer NFs obtained using the NF discovery service operation. When SCP 101 receives an SBI request, optimized multi-domain SCP router 604 may first attempt to locate the NF or NF service profile of the producer NF to which the request is directed by performing a lookup in producer profile database 606. If optimized multi-domain SCP router fails to locate the NF profile or the NF service profile in producer profile database 606, SCP 101 may attempt to obtain the NF profile or the NF service profile from an NRF using the NF discover service operation.

FIG. 7 is a flow chart illustrating an exemplary process for optimized multi-domain SCP routing. Referring to FIG. 7, in step 700, the process includes receiving an SBI request that requests service provided by a producer NF. For example, an SCP may receive an SBI request that includes a 3gpp-sbi-Target-apiRoot header that identifies a producer NF and requests service from the producer NF.

In step 702, the process includes performing a reverse lookup to obtain producer NF identification information. For example, the SCP that receives an SBI request may perform a reverse lookup using one or more parameters from the 3gpp-Sbi-Target-apiRoot header and optionally other parameters, like service name and version from the path header, to locate the NF profile and/or NF service profile of the producer NF. In one example, the target FQDN from the 3gpp-Sbi-Target-apiRoot header may be used to locate the NF profile or the NF service profile of the producer NF by comparing the FQDN to the value of the FQDN attribute in the NF profile or the NF service profile. The NF profile or the NF service profile with the FQDN attribute value that matches the value from the 3gpp-Sbi-Target-apiRoot header is used to obtain the producer NF identification information, such as the NF instance identifier and the service instance identifier.

In step 704, the process includes modifying the SBI request to include the producer NF identification information. For example, the SCP that receives the request may add the NF instance ID and/or the service instance ID to the SBI request by adding the custom vendor_producer_id and vendor_producer_service_id headers described above and inserting the NF instance ID in the vendor_producer_id header and the service instance ID in the vendor_producer_service_id header.

In step 706, the process includes determining the SCP domain of the producer NF. For example, the SCP that receives the SBI request may determine the SCP domain by reading the value of the scpDomains attribute from the NF profile located using the reverse lookup in step 702.

In step 708, the process includes routing the SBI request to a second SCP in a path for reaching the SCP domain of the producer NF. For example, the SCP that received the SBI request may determine the next-hop SCP for reaching the domain of the producer NF instance using the SCPDomainRoutingInfoGet or SCPDomainRoutingInfoSubscribe API.

In step 710, the process includes, at the second SCP, receiving the SBI request, determining that the producer NF instance identification information and the target resource identification information are associated with the same NF profile, and, in response, forwarding the SBI request to or towards the producer NF. For example, the second SCP may receive the SBI request, extract the NF instance identifier or the service instance identifier from the custom headers, locate the corresponding NF profile, and determine that the value of the FQDN attribute of the NF profile or the NF service profile matches the FQDN carried in the 3gpp-Sbi-Target-apiRoot header of the SBI request. In this example, it is assumed that the values match, so the SCP forwards the SBI request to the producer NF or to the next-hop SCP in reaching the producer NF.

Advantages of the subject matter described herein include the fact that it is optional for intermediate SCPs to recognize the custom headers carrying the producer NF identification information. An SCP instance can choose to use the information in the vendor_producer_id and vendor_producer_service_id header or ignore the headers and run default routing logic. Thus, in the case where inter-domain routing involves SCPs from multiple vendors (where some of the SCPs have not implemented optimized multi-domain SCP routing as described herein), the overall end-to-end routing will not be impacted. The custom headers vendor_producer_id and vendor_producer_service_id may be generated by SCPs other than an initial SCP encountered by an SBI request. Either or both of these headers can be injected/updated by intermediate SCPs that support optimized multi-domain SCP routing as described herein. The subject matter described herein gracefully handles the case where an intermediate SCP changes producer NF selection based on local policy. The custom headers added by SCP will help all deployment models of SCPs, i.e., where the SCP itself uses inter-domain routing or a hierarchal SCP routing model. The subject matter described herein has no functional or routing impact on consumer or producer NFs for indirect communication models as defined by 3gpp (i.e., model C and D).

The disclosure of each of the following references is hereby incorporated herein by reference in its entirety.

REFERENCES 1. 3<sup>rd</sup> Generation Partnership Project; Technical Specification Group Core Network and Terminals; 5G System; Network Technical Realization of the Service-Based Architecture; Stage 3 (Release 17) 3GPP TS 29.500 V17.6.0 (2022-03)
2. 3<sup>rd</sup> Generation Partnership Project; Technical Specification Group Core Network and Terminals; 5G System; Network Function Repository Services; Stage 3 (Release 17) 3GPP TS 29.510 V17.4.0 (2021-12)
3. Fielding et al., Hypertext Transfer Protocol (HTTP/1.1): Message Syntax and Routing; IETF RFC 7230 (June 2014)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimized multi-domain service communication proxy (SCP) routing, the method comprising:
   receiving, at a first SCP, a service based interface (SBI) request for requesting service provided by a producer network function (NF);
   performing, by the first SCP, a reverse lookup to determine producer NF identification information;
   modifying the SBI request to include the producer NF identification information;

determining an SCP domain of the producer NF;
   routing the SBI request to a second SCP in a path for reaching the SCP domain of the producer NF; and
   at the second SCP, receiving the SBI request including the producer NF identification information, determining that IP endpoint or fully qualified domain (FQDN) information in a 3gpp-Sbi-Target-apiRoot header of the SBI request matches IP endpoint or FQDN information in an NF profile or NF service profile of the producer NF obtained or located using the producer NF identification information and routing the SBI request without performing the reverse lookup.

2. The method of claim 1 wherein performing the reverse lookup includes reading an FQDN of the producer NF from a 3gpp-Sbi-Target-apiRoot header of the SBI request, using the FQDN of the producer NF to locate an NF profile or an NF service profile of the producer NF, and obtaining the producer NF identification information from the NF profile or the NF service profile.

3. The method of claim 2 wherein performing the reverse lookup includes using a service name and version from a path header of the SBI request to locate the NF profile or the NF service profile.

4. The method of claim 2 wherein obtaining the producer NF identification information from the NF profile or the NF service profile includes obtaining an NF instance identifier of the producer NF from the NF profile and a service instance identifier of the producer NF from the NF profile or the NF service profile and wherein modifying the SBI request to include the producer NF identification information includes modifying the SBI request to include the NF instance identifier and the service instance identifier of the producer NF.

5. The method of claim 1 wherein performing the reverse lookup includes performing the reverse lookup in a producer profile database local to the first SCP.

6. The method of claim 5 comprising, in response to failing to locate the NF profile or the NF service profile in the producer profile database local to the first SCP, obtaining the NF or service profile from an NF repository function (NRF) using an NF discovery service operation.

7. The method of claim 1 wherein modifying the SBI request to include the producer NF identification information includes creating at least one custom header including the producer NF identification information and adding the at least one custom header to the SBI request.

8. The method of claim 1 wherein determining a domain of the producer NF includes reading an SCP domain identifier from an scpDomains attribute of an NF profile of the producer NF and wherein routing the SBI request includes obtaining a list of domains for reaching the SCP domain of the producer NF and identifying the second SCP as a next-hop SCP from the list.

9. A system for optimized multi-domain service communication proxy (SCP) routing, the system comprising:
   a first SCP including at least one processor and a memory;
   an optimized multi-domain SCP router implemented by the at least one processor for receiving, at a first SCP, a service based interface (SBI) request for requesting service provided by a producer network function (NF), performing a reverse lookup to determine producer NF identification information, modifying the SBI request to include the producer NF identification information, determining an SCP domain of the producer NF, and routing the SBI request to or towards a domain of the producer NF; and

a second SCP for receiving the SBI request including the producer NF identification information, determining that IP endpoint or fully qualified domain (FQDN) information in a 3gpp-Sbi-Target-apiRoot header of the SBI request does not match IP endpoint or FQDN information in an NF or service profile obtained or located using the producer NF identification information of the producer NF and, in response, performing the reverse lookup.

10. The system of claim 9 wherein, in performing the reverse lookup, the optimized multi-domain SCP router is configured to read an FQDN of the producer NF from a 3gpp-Sbi-Target-apiRoot header of the SBI request, use the FQDN of the producer NF to locate an NF profile or an NF service profile of the producer NF, and obtain the producer NF identification information from the NF profile or the NF service profile.

11. The method of claim 10 wherein, in performing the reverse lookup, he optimized multi-domain SCP router is configured to use a service name and version from a path header of the SBI request.

12. The system of claim 10 wherein, in obtaining the producer NF identification information from the NF profile or the NF service profile, the optimized multi-domain SCP router is configured to obtain an NF instance identifier of the producer NF from the NF profile and a service instance identifier of the producer NF from the NF profile or the NF service profile, and, in modifying the SBI request to include the producer NF identification information, the optimized multi-domain SCP router is configured to modify the SBI request to include the NF instance identifier and the service instance identifier of the producer NF.

13. The system of claim 9 wherein the optimized multi-domain SCP router is configured to perform the reverse lookup in producer profile database local to the first SCP or obtain the profile or the NF service profile using an NF discovery service operation.

14. The system of claim 9 wherein, in modifying the SBI request to include the producer NF identification information, the optimized multi-domain SCP router is configured to create at least one custom header including the producer NF identification information and add the at least one custom header to the SBI request.

15. The system of claim 9 wherein, in determining a domain of the producer NF, the optimized multi-domain SCP router is configured to read an SCP domain identifier from an scpDomains attribute of an NF profile of the producer NF and, in routing the SBI request, the optimized multi-domain SCP router is configured to obtain a list of domains for reaching the SCP domain of the producer NF and identify a second SCP as a next-hop SCP from the list.

16. A method for optimized multi-domain service communication proxy (SCP) routing, the method comprising:

receiving, at a first SCP, a service based interface (SBI) request for requesting service provided by a producer network function (NF);

performing, by the first SCP, a reverse lookup to determine producer NF identification information;

modifying the SBI request to include the producer NF identification information;

determining an SCP domain of the producer NF;

routing the SBI request to a second SCP in a path for reaching the SCP domain of the producer NF; and at the second SCP, receiving the SBI request including the producer NF identification information, determining that IP endpoint or fully qualified domain (FQDN) information in a 3gpp-Sbi-Target-apiRoot header of the SBI request does not match IP endpoint or FQDN information in an NF or service profile obtained or located using the producer NF identification information of the producer NF and, in response, performing the reverse lookup.

17. A system for optimized multi-domain service communication proxy (SCP) routing, the system comprising:

a first SCP including at least one processor and a memory;

an optimized multi-domain SCP router implemented by the at least one processor for receiving, at a first SCP, a service based interface (SBI) request for requesting service provided by a producer network function (NF), performing a reverse lookup to determine producer NF identification information, modifying the SBI request to include the producer NF identification information, determining an SCP domain of the producer NF, and routing the SBI request to or towards a domain of the producer NF; and a second SCP for receiving the SBI request including the producer NF identification information, determining that IP endpoint or fully qualified domain (FQDN) information in a 3gpp-Sbi-Target-apiRoot header of the SBI request does not match IP endpoint or FQDN information in an NF or service profile obtained or located using the producer NF identification information of the producer NF and, in response, performing the reverse lookup.

18. One or more non-transitory computer readable media having stored thereon executable instructions that when executed by one or more processors of one or more computers control the one or more computers to perform steps comprising:

receiving, at a first service communication proxy (SCP), a service based interface (SBI) request for requesting service provided by a producer network function (NF);

performing, by the first SCP, a reverse lookup to determine producer NF identification information;

modifying the SBI request to include the producer NF identification information;

determining an SCP domain of the producer NF;

routing the SBI request to a second SCP in a path for reaching the SCP domain of the producer NF; and at the second SCP, receiving the SBI request including the producer NF identification information, determining that IP endpoint or fully qualified domain FQDN) information in a 3gpp-Sbi-Target-apiRoot header of the SBI request matches IP endpoint or FQDN information in an NF profile or NF service profile of the producer NF obtained or located using the producer NF identification information and routing the SBI request without performing the reverse lookup.

* * * * *